United States Patent
Acosta et al.

(10) Patent No.: US 8,275,109 B2
(45) Date of Patent: Sep. 25, 2012

(54) ADMINISTERING PARTICIPANT ATTENDANCE OF TELECONFERENCES

(75) Inventors: Jan E. Acosta, Austin, TX (US); Carrie J. Bracht, Austin, TX (US); James L. Jones, Austin, TX (US); Karen A. Rosengren, Round Rock, TX (US); Elizabeth V. Woodward, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 790 days.

(21) Appl. No.: 12/415,098

(22) Filed: Mar. 31, 2009

(65) Prior Publication Data
US 2010/0246792 A1 Sep. 30, 2010

(51) Int. Cl.
*H04M 7/00* (2006.01)
(52) U.S. Cl. ............ 379/202.01; 709/204; 370/261
(58) Field of Classification Search ........... 379/202.01; 709/204; 370/261
See application file for complete search history.

(56) References Cited

U.S. PATENT DOCUMENTS

| 6,798,753 | B1 | 9/2004 | Doganata et al. |
| 7,016,935 | B2 | 3/2006 | Lee et al. |
| 7,139,379 | B2 | 11/2006 | Kobrosly et al. |
| 7,706,517 | B1* | 4/2010 | Todd ............ 379/202.01 |
| 2005/0174951 | A1* | 8/2005 | Schrader et al. ........ 370/260 |
| 2008/0133662 | A1 | 6/2008 | Demsky et al. |

FOREIGN PATENT DOCUMENTS
GB 2319136 A 5/1998

OTHER PUBLICATIONS

Shacham et al. Composition for Enhanced SIP presence, published in 2007, based on IEEE publication.*

* cited by examiner

*Primary Examiner* — Quynh Nguyen
(74) *Attorney, Agent, or Firm* — DeLizio Gilliam, PLLC

(57) ABSTRACT

Administering participant attendance of teleconferences, including monitoring present call status of a user's telephone. In dependence upon one or more calendar events representing previously scheduled teleconferences, a teleconference administration device determines whether the present call status of the user's telephone conflicts with a previously scheduled teleconference. If the present call status of the user's telephone conflicts with a previously scheduled teleconference, the teleconference administration device notifies prospective participants of the conflict.

15 Claims, 6 Drawing Sheets

ADMINISTERING PARTICIPANT ATTENDANCE OF TELECONFERENCES

BACKGROUND OF THE INVENTION

1. Field of the Invention

The field of the invention is data processing, or, more specifically, methods, apparatus, and products for administering participant attendance of teleconferences.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computer systems today enable users to exchange information efficiently. One way in which a computer system enables such efficient exchange of information is through calendar applications that allow a user to schedule meetings, such as teleconferences. Problems arise, however, when a person, say 'Joe,' is presently in a first teleconference, but scheduled to participate in a second, different teleconference with different parties, say 'Mary' and 'Bob.' In current art, there are very few ways for Joe to inform Mary or Bob that Joe will be either late to the second teleconference or absent completely. Email applications and instant messaging ('IM') applications are two tools in the current art which may be used to inform parties of a possible or current conflict, but both tools are inefficient for such use. Email applications, for example, may involve a delay and be disruptive to the conflicting teleconference. IM applications, in the same manner, are typically extremely disruptive causing a user to lose focus on the presently conflicting teleconference.

SUMMARY OF THE INVENTION

Computer-implemented methods, apparatus, and products for administering participant attendance of teleconferences, including monitoring, by a teleconference administration device comprising one or more modules of automated computing machinery, present call status of a user's telephone; determining, by the teleconference administration device in dependence upon one or more calendar events representing previously scheduled teleconferences, whether the present call status of the user's telephone conflicts with a previously scheduled teleconference; and if the present call status of the user's telephone conflicts with a previously scheduled teleconference, notifying, by the teleconference administration device, prospective participants of the conflict.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
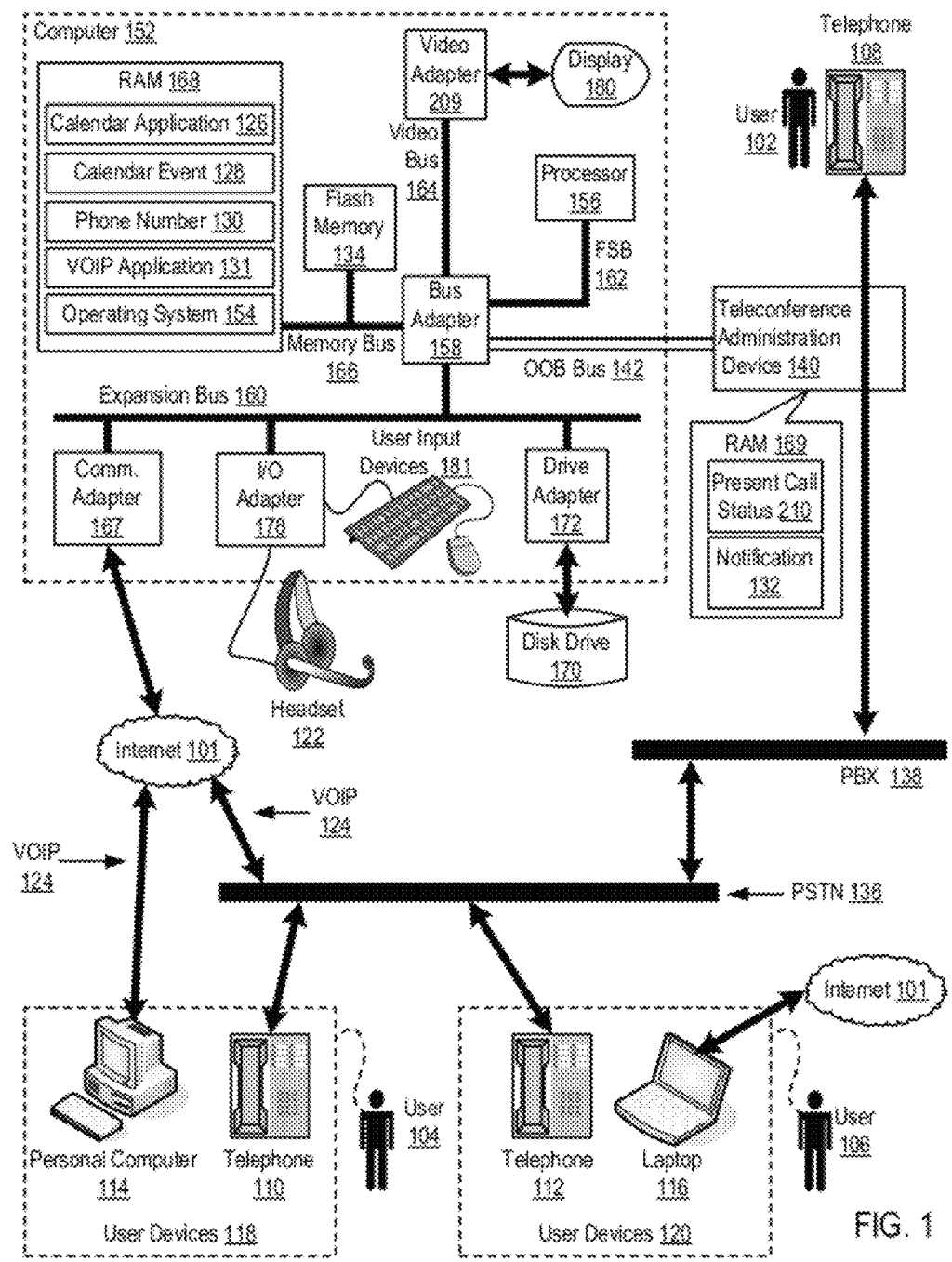
FIG. 1 sets forth a network diagram of an exemplary system for administering participant attendance of teleconferences according to embodiments of the present invention.

Exemplary methods, apparatus, and products for administering participant attendance of teleconferences in accordance with the present invention are described with reference to the accompanying drawings, beginning with FIG. 1. FIG. 1 sets forth a network diagram of an exemplary system for administering participant attendance of teleconferences according to embodiments of the present invention. A teleconference as the term is used in this specification refers to the live exchange and mass articulation of information among persons, called participants, and machines remote from one another but linked by a telecommunications system. In addition to audio of speech, such teleconferences may also include video. In video-teleconferences, live video of a participant is streamed to another participant in the video-teleconference.

FIG. 1 depicts several users (102, 104, 106) which may be prospective participants to one or more teleconferences. The users (102, 104, 106) are connected for data and telephone communications through various data communication networks, telephone networks, devices (118, 120), and protocols including typical handset telephones (108, 110, 112), computer (152), personal computer (114), laptop (116), the Private Branch Exchange ('PBX') (138), Public Switched Telephone Network ('PSTN')(136), the Internet (101), and Voice Over Internet Protocol ('VoIP') (124).

Telephones useful in connecting participants in a teleconference may be implemented in various ways. Telephones may be implemented as typical handset telephones, wireless handsets, mobile phones, or VoIP phones. VoIP stands for 'Voice Over Internet Protocol,' a generic term for routing speech over an IP-based data communications network. The speech data at some point in traveling to a recipient, flows over a general-purpose packet-switched data communications network, instead of traditional dedicated, circuit-switched voice transmission lines. Protocols used to carry voice signals over the IP data communications network are commonly referred to as 'Voice over IP' or 'VoIP' protocols. VoIP traffic may be deployed on any IP data communications network, including data communications networks lacking a connection to the rest of the Internet, for instance on a private building-wide local area data communications network or 'LAN.'

Many protocols are used to effect VoIP. The two most popular types of VoIP are effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VoIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

In the example of FIG. 1, a VoIP phone may be implemented for user (102) with the computer (152), VoIP application (131), the headset (122) connected to the computers I/O adapter (178), and the computer's (152) data communications connection with the Internet (101), a wide area network data communications network connection. The VoIP application (131) is a module of automated computing machinery capable of administering data communications representing speech and video over a VoIP connection. A VoIP connection (124) may be established between the user's (102) computer and the personal computer (114) of the user (104) through the Internet (101), between the computer (152) and the telephone (110) of the user (104) through the Internet (101) and the PSTN (136), between the computer (152) and telephone (112) of the user (106) through the Internet (101) and the PSTN (136), and between the computer (152) and the laptop (116) of the user (106) through the Internet (101).

The user's (102) computer (152) of FIG. 1 includes at least one computer processor (156) or 'CPU' as well as random access memory (168) ('RAM') which is connected through a high speed memory bus (166) and bus adapter (158) to processor (156) and to other components of the computer (152). Stored in RAM (168) of the computer (152) is a calendar application (126), a module of computer program instructions that provides to a user, electronic versions of a variety of office tools such as a calendar, appointment book, address book, and contact list. These tools are an extension of many of the features provided by time management software such as desk accessory packages and mainframe office automation systems. Examples of calendar applications that may be improved for administering participant attendance of teleconferences in accordance with embodiments of the preset invention include Microsoft Outlook™, Mozilla Thunderbird™, Google Calendar™, Apple iCal™, and others that may occur to readers of skill in the art.

When a user schedules, through a calendar application (126) configured for administering participant attendance of teleconference in accordance with embodiments of the present invention, an appointment for a time on particular day, with a particular participant, such as a teleconference for example, the calendar application (126) creates a calendar event and stores the event in computer memory, such as RAM (168), Flash memory (134), or disk drive (170). A calendar event is a data structure that includes information describing a previously scheduled event, such as a meeting, teleconference, birthday, anniversary, vacation days, and the like. Calendar events representing teleconferences useful in systems that administer participant attendance of such teleconferences according to embodiments of the present invention may include such example information as a date of a teleconference, a start and end time of a teleconference, a call-in telephone number for a teleconference, names of participants of a teleconference, and contact information of participants of a teleconference such as phone numbers, email addresses, facsimile numbers, and the like. Calendar events and calendar applications are described in greater detail below with respect to FIG. 6.

Also stored in RAM (168) is an operating system (154). Operating systems useful for administering participant attendance of teleconferences according to embodiments of the present invention include UNIX™, Linux™, Microsoft XP™, AIX™, IBM's i5/OS™, and others as will occur to those of skill in the art. The operating system (154), calendar application (126), VoIP application (131), calendar event (128), and so on in the example of FIG. 1 are shown in RAM (168), but many components of such software typically are stored in non-volatile memory also, such as, for example, on a disk drive (170) or Flash memory (134).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers that administering participant attendance of teleconferences according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards, mice, and headsets (122) the include a microphone and earphones. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers, such as the personal computer (114) and laptop (116), and for data communications with a data communications network, the Internet (101) in this example. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for administering participant attendance of teleconferences according to embodiments of the present invention include modems for wired dial-up communications, Ethernet (IEEE 802.3) adapters for wired data communications network communications, and 802.11 adapters for wireless data communications network communications.

In the system of FIG. 1, a teleconference administration device (140) is connected for data communications to the computer (152) through an out-of-band bus (142). The out-of-band bus (142) connecting the teleconference administration device (140) to the computer (152) for data communications may be implemented as any type of bus, an Inter- Integrated Bus (I²C bus), a Universal Serial Bus ('USB'), an RS485 bus, a 1-wire bus, and other as will occur to readers of skill in the art.

A teleconference administration device (140) is one or more modules of automated computing machinery, an aggregation of computer hardware and software capable of administering participant attendance of teleconferences according to embodiments of the present invention. the teleconference administration device (140) administers participant attendance of teleconferences according to embodiments of the present invention by: monitoring present call status (210) of a user's (102) telephone (108), in dependence upon one or more calendar events (128) representing previously scheduled teleconferences, whether the present call status (210) of the user's (102) telephone (108) conflicts with a previously scheduled teleconference; and if the present call status (210) of the user's (102) telephone (108) conflicts with a previously scheduled teleconference, notifying, by the teleconference administration device (104), prospective participants (210) of the conflict.

Consider, for example, that the calendar event (128) stored in RAM represents a teleconference between user (102) and user (106) scheduled to begin at 10:00 AM. At 10:00 AM, the present call status (210) for the user (102) monitored by the teleconference administration device (140) represents that the user (102) is presently in a teleconference with user (104). The teleconference administration device (140) determines, from the calendar event (128) that the present call status of the user (102) conflicts with a previously schedule teleconference. That is, the present teleconference at 10:00 AM between user (102) and user (104) conflicts with the previously scheduled teleconference between user (102) and (106). The teleconference administration device then notifies user (106) of the conflict.

Teleconference administration devices (140) configured to administer participant attendance of teleconferences according to embodiments of the present invention may be implemented with a variety of technology and form factors, including for example, a microcontroller, a Field Programmable Gate Array ('FPGA'), an Application Specific Integrated Circuit ('ASIC'), a System on a Chip ('SOC'), a personal computer or laptop, or any other automated computing machinery as will occur to readers of skill in the art. In the example of FIG. 1, for clarity of explanation only not limitation, the teleconference administration device is depicted as a stand-alone module which monitors call status of a user's (102) telephone (108) through tapping the line connecting the telephone (108) to the PBX (138). The teleconference administration device may also be implemented in other ways including, for example, as:

- a combination of a computer (152) and a separate stand-alone hardware device, where the computer (152) executing software that controls operation of the stand-alone hardware device;
- as a module of automated computing machinery, some aggregation of computer hardware and software, installed directly within the user's (102) telephone (108) itself;
- a module installed and operated from within the aggregation of hardware and software implementing a private branch exchange ('PBX') (138);
- a module installed and operated from within the aggregation of hardware and software implementing the Public Switched Telephone Network ('PSTN') (136);
- a module of software stored in RAM (168) of the computer (152) and executed by the processor (156) when the computer (152) operates as a VoIP phone;
- a software plug-in to the calendar application, where the user's telephone is connected for data communications with the computer (152); and
- in other ways as will occur to readers of skill in the art.

The arrangement of computer (152), personal computer (114), laptop (116), teleconference administration device (140), telephones (108, 110, 112), telephone and data communication networks, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
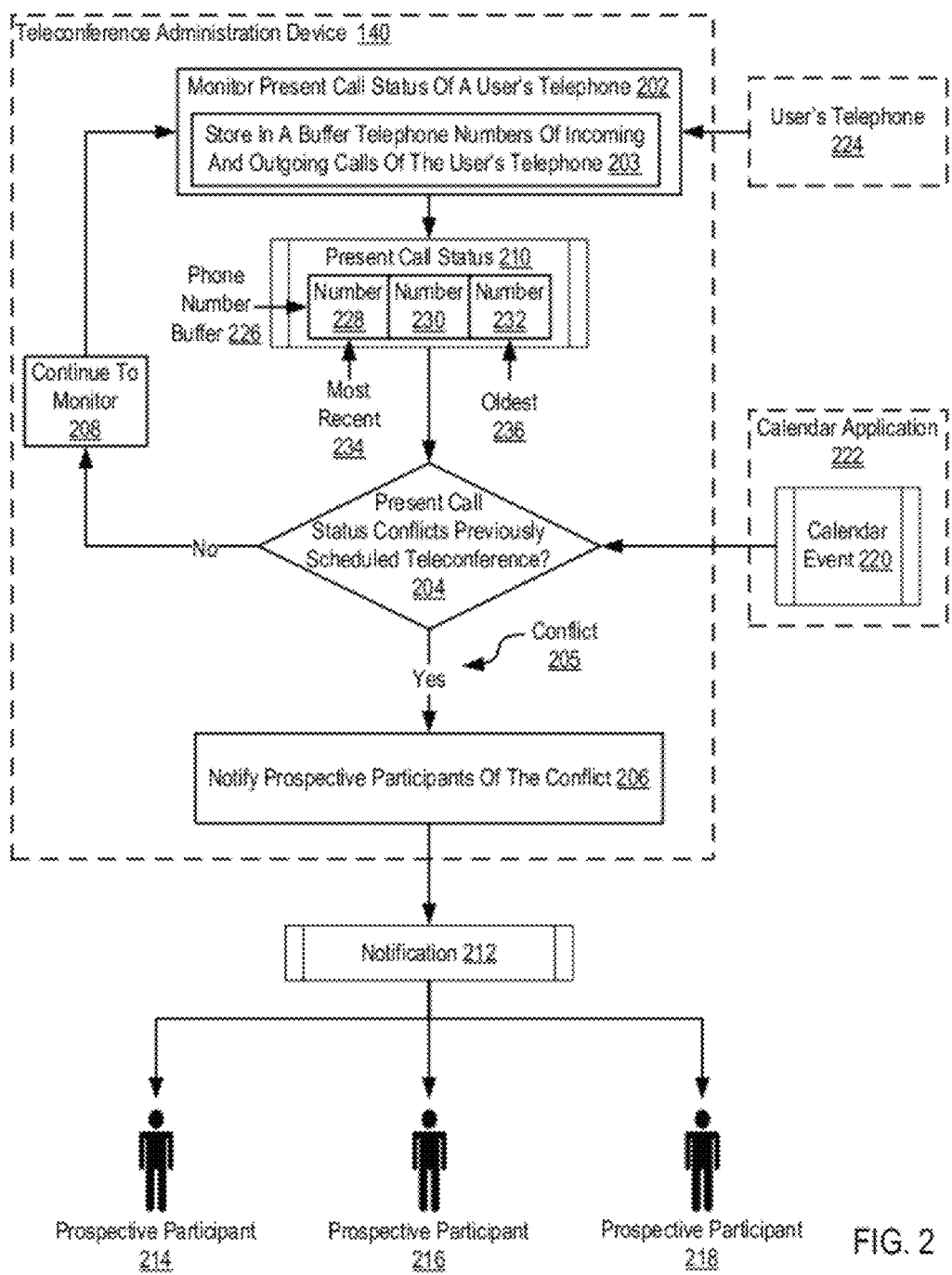
FIG. 2 sets forth a flow chart illustrating an exemplary method for administering participant attendance of teleconferences according to embodiments of the present invention.

For further explanation, FIG. 2 sets forth a flow chart illustrating an exemplary method for administering participant attendance of teleconferences according to embodiments of the present invention. The method of FIG. 2 includes monitoring (202), by a teleconference administration device (140) comprising one or more modules of automated computing machinery, present call status (210) of a user's telephone (224). In the method of FIG. 2, monitoring (202) present call status (210) of a user's telephone (224) may be carried out by storing (203) in a buffer (226) telephone numbers (228, 230, 232) of incoming and outgoing calls of the user's telephone (224). Storing (203) (226) telephone numbers (228, 230, 232) of incoming and outgoing calls of the user's telephone (224) in a buffer may be carried out in various ways including, for example, capturing from the telephone data representing numbers of pressed numbers-buttons on a dialpad of the user's telephone, receiving caller identification data specifying the telephone number of an incoming call, through Automatic Number Identification ('ANI'), and in other ways as will occur to readers of skill in the art.

The method of FIG. 2 also includes, determining (204), by the teleconference administration device (140) in dependence upon one or more calendar events (220) representing previously scheduled teleconferences, whether the present call status (210) of the user's telephone (224) conflicts with a previously scheduled teleconference. If the present call status (210) of the user's telephone (224) conflicts with a previously scheduled teleconference, the method of FIG. 2 continues by notifying (206), by the teleconference administration device (140), prospective participants (214, 216, 218) of the conflict. Notifying (206) prospective participants (214, 216, 218) of the conflict may be carried out in a number of ways including for example, by sending a notification (212) in one or more data communications packets across a data communications network to the prospective participants (214, 216, 218) which are depicted as human users in the FIGS. 2-5 for clarity of explanation. The term 'user,' in fact, as used in this specification may refer as context requires to computers, software applications, telephones, or other devices operated by a human user.

Figure 3:
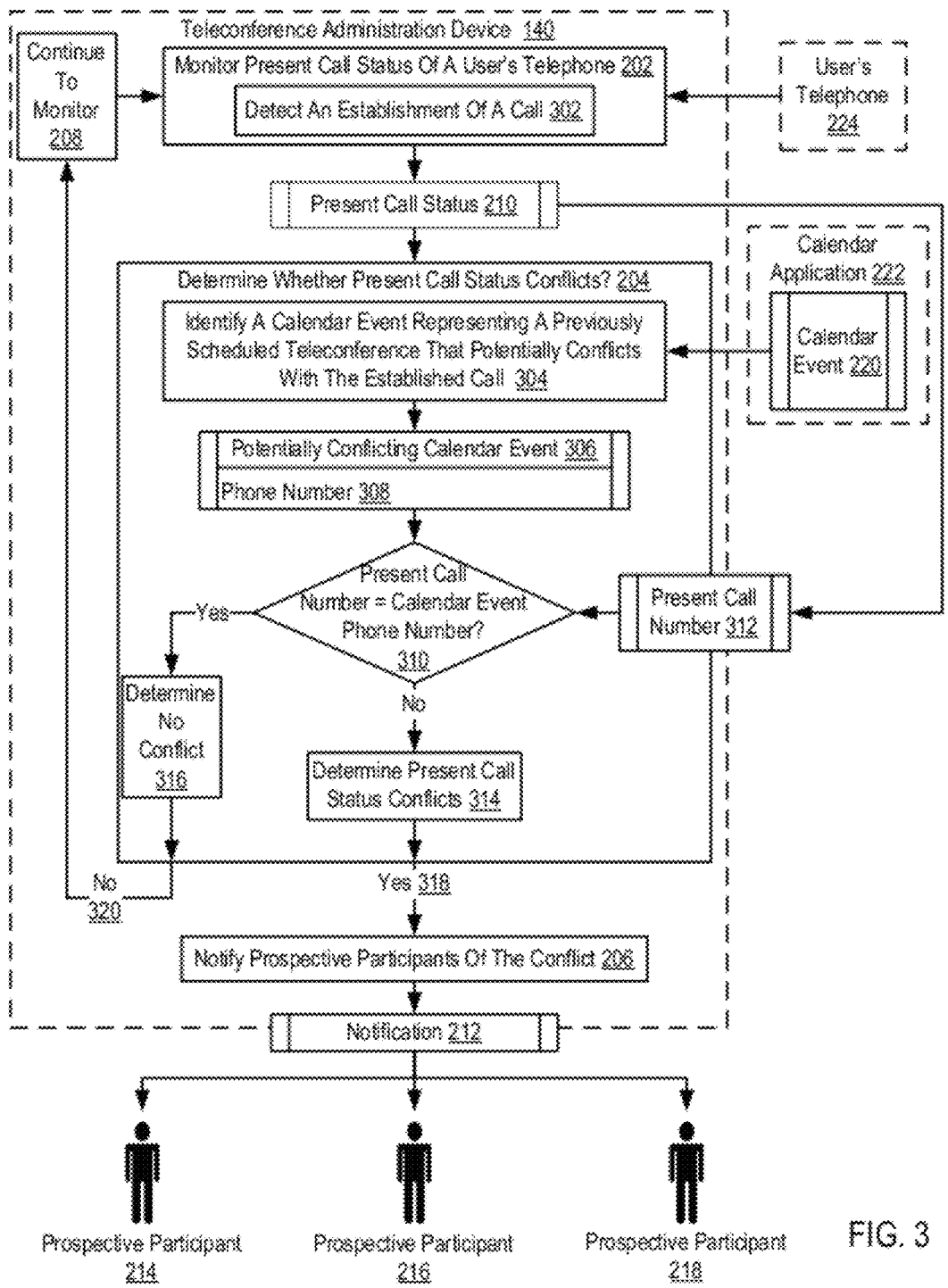
FIG. 3 sets forth a flow chart illustrating a further exemplary method for administering participant attendance of teleconferences according to embodiments of the present invention.

For further explanation, FIG. 3 sets forth a flow chart illustrating a further exemplary method for administering participant attendance of teleconferences according to embodiments of the present invention. The method of FIG. 3 is similar to the method of FIG. 2 including as it does the teleconference administration device's (140) monitoring (202) present call status (210) of a user's telephone (224); determining (204), in dependence upon one or more calendar events (220) representing previously scheduled teleconferences, whether the present call status (210) of the user's telephone (224) conflicts with a previously scheduled teleconference; and if the present call status (210) of the user's telephone (224) conflicts with a previously scheduled teleconference, notifying (206) prospective participants (214, 216, 218) of the conflict.

In the method of FIG. 3, however, monitoring (202) present call status (210) of a user's telephone (224) includes detecting (302) an establishment of a call. Detecting (302) an establishment of a call may be carried out in a variety of ways, many of which are implementation-specific, such as, for example, receiving a call establishment notification from a VoIP application; identifying from the user's telephone line connecting the telephone to a telephone network one or more signals representing an established call, and in other ways as may occur to readers of skill in the art. In this example, the teleconference administration device (140) is passive device, collecting present call status only when a call is established.

Also in the method of FIG. 3, determining (204) whether the present call status (210) conflicts with a previously scheduled teleconference is carried out by identifying (304) a calendar event (306) representing a previously scheduled teleconference that potentially conflicts with the established call, the calendar event specifying a phone number (308) for the previously scheduled teleconference; determining (310) whether a phone number (312) of the established call matches the phone number (308) specified by the calendar event (306) representing the previously scheduled teleconference; if the phone number (312) of the established call matches the phone number (308) specified by the calendar event (306) representing the previously scheduled teleconference, determining (316) that the present call status (210) of the user's telephone (224) does not conflict with the previously scheduled teleconference; and if the phone number (312) of the established call does not match the phone number (308) specified by the calendar event (306) representing the previously scheduled teleconference, determining (314) that the present call status (210) of the user's telephone (224) does conflict with the previously scheduled teleconference.

Identifying (304) a calendar event (306) representing a previously scheduled teleconference that potentially conflicts with the established call, the calendar event specifying a phone number (308) for the previously scheduled teleconference may be carried out in various ways including, for example, receiving from a calendar application a notification of an upcoming event along with the information stored in the calendar event; requesting, from the calendar application, nearest in time calendar events, reading from a database or other repository of the calendar events, without knowledge of the calendar application, the calendar events; and in other ways as will occur to readers of skill in the art.

Determining (310) whether a phone number (312) of the established call matches the phone number (308) specified by the calendar event (306) representing the previously scheduled teleconference may be carried out by identifying, with caller identification data or the like, the phone number of the incoming or outgoing call of user's telephone and comparing that telephone number to the telephone number listed in the calendar event (306). When the two numbers match, the teleconference administration device (140) determines that no conflict exists. That is, the user is currently in the previously scheduled teleconference represented by the calendar event (306). If the two numbers do not match, however, the teleconference administration device (140) determines that there is a conflict and notifies the prospective participants of the previously scheduled teleconference. That is, the user is currently not in the previously scheduled teleconference represented by the calendar event (306).

Figure 4:
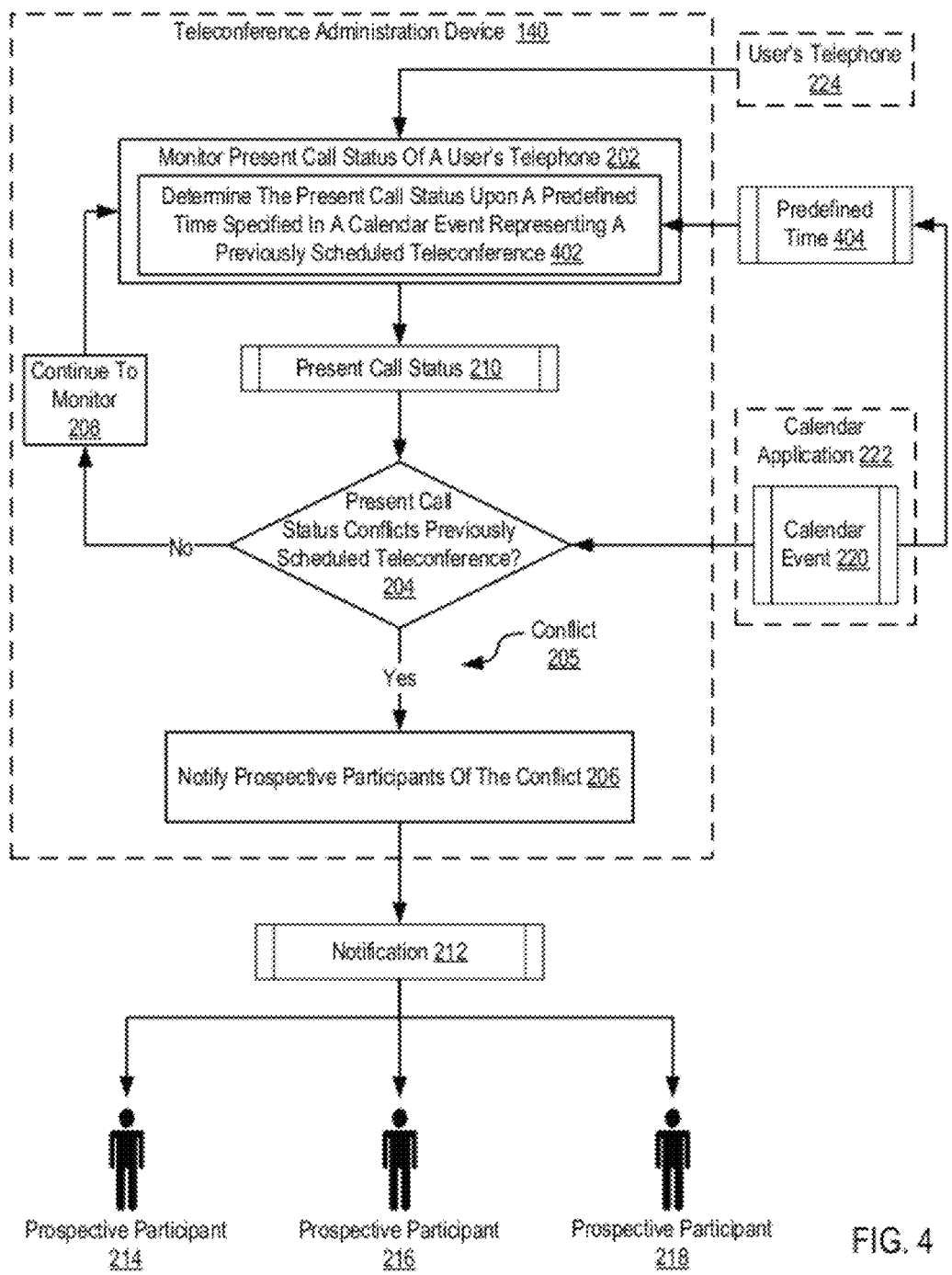
FIG. 4 sets forth a flow chart illustrating a further exemplary method for administering participant attendance of teleconferences according to embodiments of the present invention.

For further explanation, FIG. 4 sets forth a flow chart illustrating a further exemplary method for administering participant attendance of teleconferences according to embodiments of the present invention. The method of FIG. 4 is similar to the method of FIG. 2 including as it does the teleconference administration device's (140) monitoring (202) present call status (210) of a user's telephone (224); determining (204), in dependence upon one or more calendar events (220) representing previously scheduled teleconferences, whether the present call status (210) of the user's telephone (224) conflicts with a previously scheduled teleconference; and if the present call status (210) of the user's telephone (224) conflicts with a previously scheduled teleconference, notifying (206) prospective participants (214, 216, 218) of the conflict.

FIG. 4 differs from FIG. 2, however, in that in the method of FIG. 4, monitoring (202) present call status (210) of a user's telephone (224) includes determining (402), upon a predefined time (404) specified in a calendar event (220) representing a previously scheduled teleconference, the present call status (210) of the user's telephone (224). Examples of such a predefined time (404) include five minutes prior to a start time specified in the calendar event (220), 9:55 AM, and so on. In this example, the teleconference administration device (140) is a passive device, monitoring the present call status only at times defined in calendar events—only at times when a conflict potentially exists. Depending upon the implementation of the teleconference administration device—a stand-alone module, software running on a computer that also runs the calendar application, and so on—the teleconference administration device (140) may acquire the predefined time and other calendar event data in various ways.

Consider the following example ways in which a teleconference administration device (140) that administers participant attendance of teleconferences according to embodiments of the present invention may acquire information included in a calendar event (220). When the teleconference administration device (140) is implemented as a device separate from a computer executing the calendar application, the teleconference administration device may acquire information included in a calendar event by, for example, requesting or receiving the information from the calendar application through one or more data communications packets transmitted over an out-of-band bus connecting the teleconference administration device (140) to the computer or through in-band communications over and data communication network, such as a wide area network or local area network. When the teleconference administration device (140) is implemented is a software application, separate from the calendar application, executing in the same computer which the calendar application is executed, the teleconference administration device (140) may request or receive information included in a calendar event from the calendar application through inter-process sockets, or by requesting the information through an application programming interface ('API') exposed to the teleconference administration device (140) by the calendar application. When the teleconference administration device (140) is implemented as a plug-in for the calendar application, the teleconference administration device (140) may retrieve information from memory allocated to the calendar application in memory locations available to the plug-in. Readers of skill in the art will recognize that there are many other ways in which a teleconference administration device (140) configured to administer participant attendance of teleconference according to embodiments of the present invention may be implemented and many other ways of acquiring information included in calendar events of a calendar application and each such way is well within the scope of the present invention.

Figure 5:
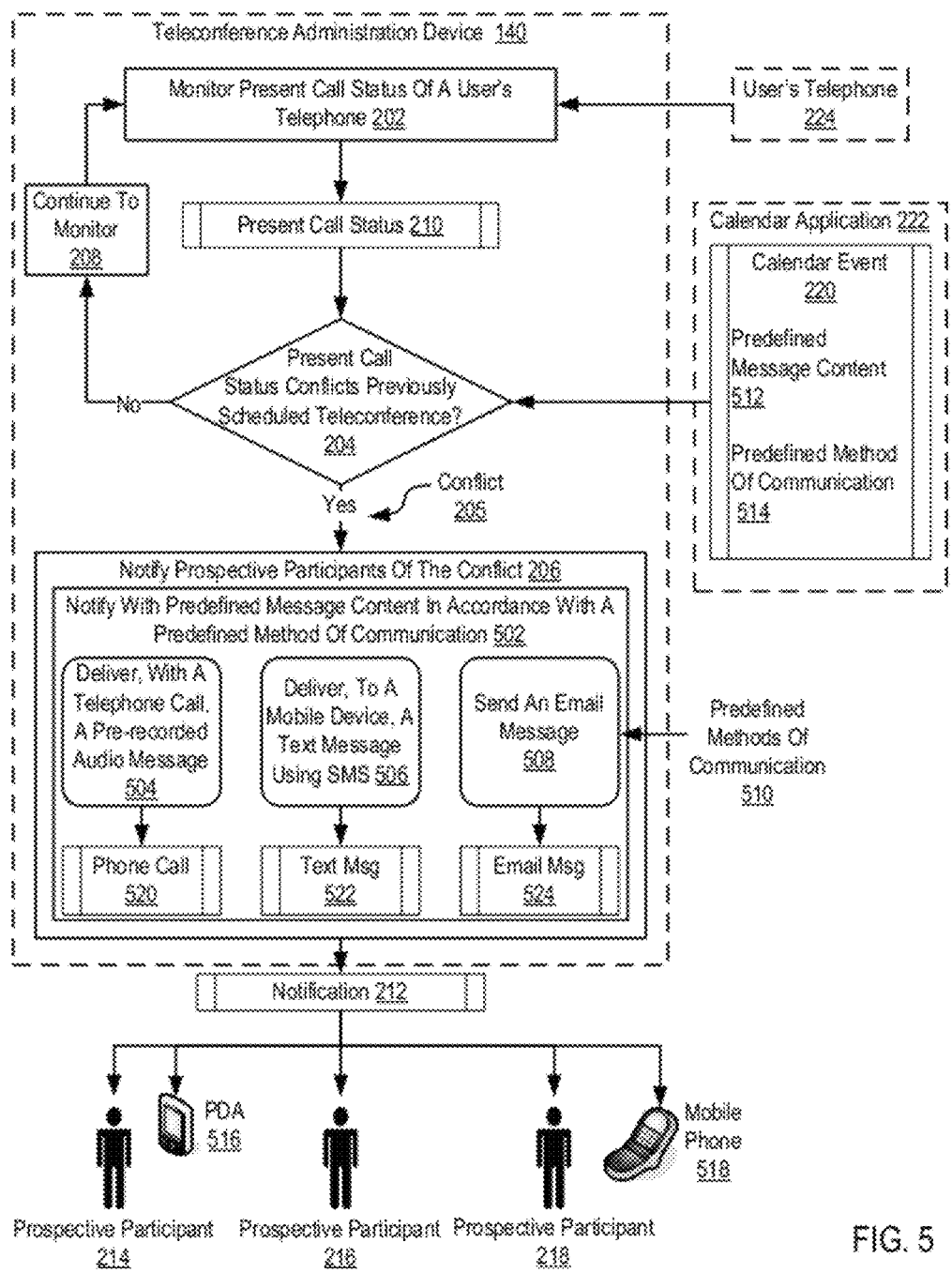
FIG. 5 sets forth a flow chart illustrating a further exemplary method for administering participant attendance of teleconferences according to embodiments of the present invention.

For further explanation, FIG. 5 sets forth a flow chart illustrating a further exemplary method for administering participant attendance of teleconferences according to embodiments of the present invention. The method of FIG. 5 is similar to the method of FIG. 2 including as it does the teleconference administration device's (140) monitoring (202) present call status (210) of a user's telephone (224); determining (204), in dependence upon one or more calendar events (220) representing previously scheduled teleconferences, whether the present call status (210) of the user's telephone (224) conflicts with a previously scheduled teleconference; and if the present call status (210) of the user's telephone (224) conflicts with a previously scheduled teleconference, notifying (206) prospective participants (214, 216, 218) of the conflict.

The method of FIG. 5 differs from the method of FIG. 2, however, in that in the method of FIG. 5, notifying (206) prospective participants (214, 216, 218) of the conflict is carried out by notifying (502) the prospective participants (214, 216, 218) with predefined message content (512) in accordance with a predefined method (514) of communication. The predefined method (514) of communication and the predefined message content (512) is specified in the calendar event (220) representing the previously scheduled teleconference conflicting with the present call status of the user's telephone (224).

A method (514) of communication specified in a calendar event is a specification of data communications type and configuration with which the teleconference administration is to send a notification (212). Examples of such methods include telephone message, text message, email message, and others as will occur to readers of skill in the art.

A user may define methods of communication for all prospective participants regardless of a calendar event, separately for each prospective participant regardless of a calendar event, separately for each prospective participant of each, separate calendar event; and in other ways as will occur to readers of skill in the art. When defining methods of communication for all prospective participants for all calendar events, a user may define a priority of communication methods to use, in dependence upon available contact information. Consider, for example, that a user defines the following priority of communication methods to use for all prospective participants for all calendar events: email messages, text message, telephone voice message. If contact information of a prospective participant, say 'Brandon,' for a particular calendar event includes, as contact information, only a telephone number with a restriction against text messaging, for example, the teleconference administration will determine not to use an email message because no email address is provided, then determine not to use a text message because of the restriction placed on the use of Brandon's phone number, then determine that a telephone voice message may be sent to Brandon's telephone number.

A predefined message is a message specified by a user to be sent to a prospective participant when a conflict arises with a previously scheduled teleconference. Like the methods of a communication discussed above, a predefined message may be specified in various ways, including, specifying one message to use for any and all prospective participants regardless of a calendar event—a global message, specifying a separate message for each prospective participant to be used for any and all calendar events, specifying a different message for each prospective participant to be used for a particular calendar event, and in other ways as will occur to readers of skill in the art. Examples of predefined messages include, "I am in another meeting at the moment. Please begin our teleconference without me," "Running late to our meeting," "I apologize, but I will not be able to make our teleconference. Please contact my office to reschedule," and the like.

In the method of FIG. 5, the predefined method (514) of communication may be one of three alternative methods (510) including delivering (504), with a telephone call (520) to a prospective participant's (214, 216, 218) telephone number specified for the calendar event of the previously scheduled teleconference conflicting with the present call status of the user's telephone, a pre-recorded audio message that includes the predefined message content (512); delivering (506), to a mobile device (516, 518) of a prospective participant in a previously scheduled teleconference conflicting with the present call status (210) of the user's telephone, a text message (522) using Short Message Service ('SMS') that includes the predefined message content (514); or sending (508), to a prospective participant (214, 216, 218) of a previously scheduled teleconference conflicting with the present call status (210) of the user's telephone (224), an email message (524) that includes the predefined message content (512).

Figure 6:
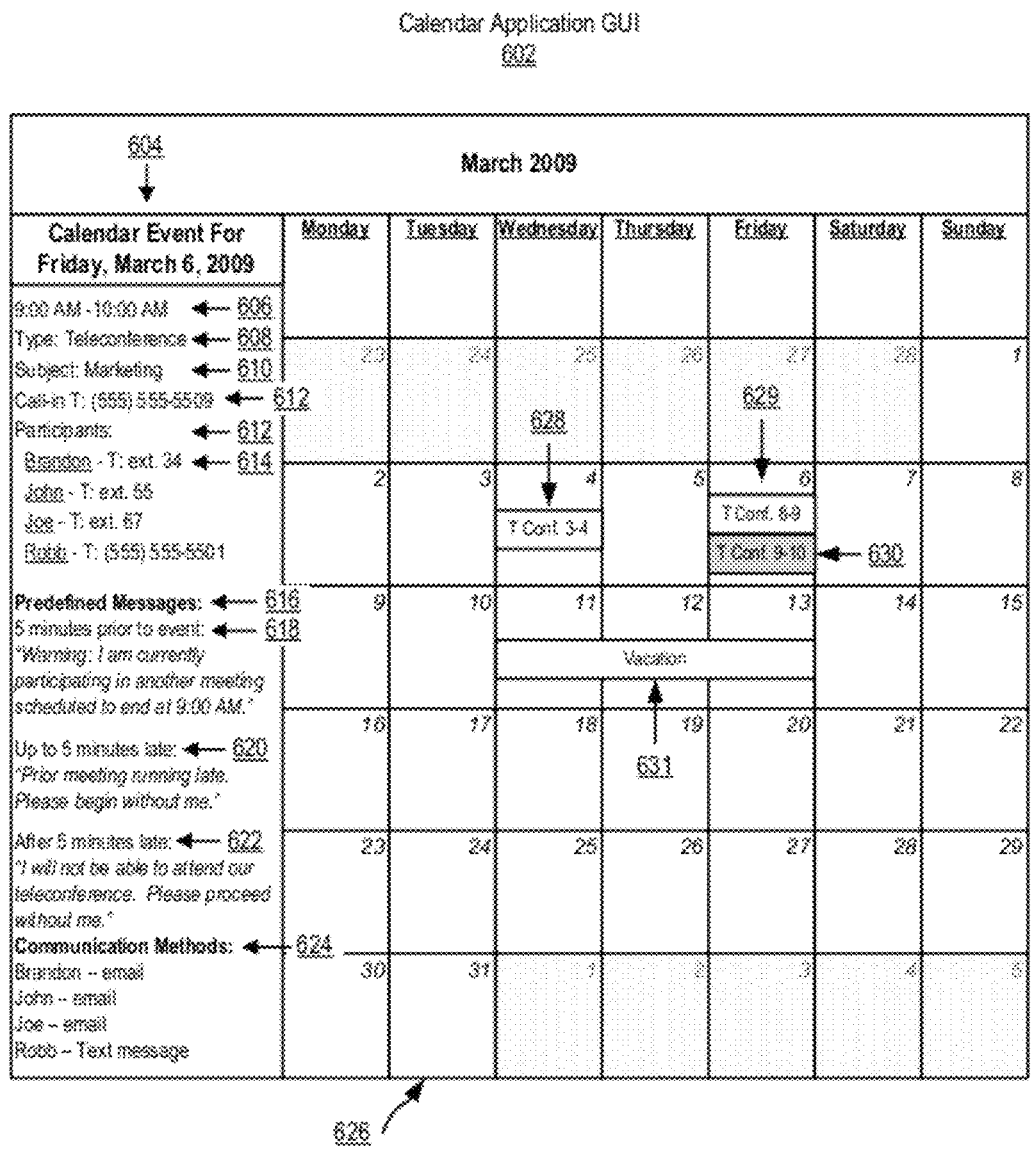
FIG. 6 sets forth an exemplary graphical user interface ('GUI') of a calendar application configured for use in systems that administer participant attendance of teleconferences according to embodiments of the present invention.

For further explanation, FIG. 6 sets forth an exemplary graphical user interface ('GUI') (602) of a calendar application configured for use in systems that administer participant attendance of teleconferences according to embodiments of the present invention. The example GUI depicts a calendar for the month of March in the year 2009. In FIG. 6, a user has previously scheduled several events, a teleconference on March 4, from 3-4 PM (628), a teleconference on March 6, from 8-9 AM (629), a teleconference on March 6 from 9-10 AM (630), and vacation from March 11-March 13 (631). The events (628-631) are represented as rectangular, selectable GUI item located in the calendar on the day corresponding to the day of the event. That is, the teleconference for March 4 from 3-4 is represented by a GUI item located on March 4 on the calendar (626). In the example of FIG. 6, a user has selected the rectangular GUI item for the 9-10 AM event for March 6 through use of a user I/O device, such as a mouse or keyboard. The calendar application, upon the selection of the GUI item for the 8-9 AM event on March 6, displays in a Calendar Event Pane (604) of the GUI (602) located to the left of the calendar (626), information included in the calendar event. In this example, the calendar event includes such information as:
  the time (606) of the event, 9:00 AM-10:00 AM;
  the type (608) of the event, a Teleconference;
  the subject (610) of the event, Marketing;
  the prospective participants (612) of the event, Brandon, John, Joe, and Robb;
  several predefined messages (616) to be delivered to prospective participants if a conflict arises; and
  communication methods (624) for each participant which the calendar application uses in sending predefined messages to each prospective participant.

In the example of FIG. 6, the calendar event (604) for Friday, Mar. 6, 2009 also includes contact information for the prospective participants (612) such as telephone numbers and email addresses. Consider as an example of contact information, the information associated with Brandon (614) that includes a telephone extension number '34' and a hyperlink, represented by the underlined text 'Brandon,' which includes Brandon's email address.

Also in the example of FIG. 6, the calendar event (604) includes several predefined messages (616), predefined times (618, 620, 622) at which to send the messages, and predefined methods of communication (624) for notifying the prospective participants of a conflict.

Exemplary embodiments of the present invention are described largely in the context of a fully functional computer system for administering participant attendance of teleconferences. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method of administering participant attendance of teleconferences, the method comprising:

monitoring, by a teleconference administration device comprising one or more modules of automated computing machinery, present call status of a user's telephone, wherein said monitoring comprises detecting an establishment of a call;

determining, by the teleconference administration device in dependence upon one or more calendar events representing previously scheduled teleconferences, whether the present call status of the user's telephone conflicts with a previously scheduled teleconference, wherein said determining whether the present call status of the user's telephone conflicts with the previously scheduled teleconference comprises, identifying a calendar event representing the previously scheduled teleconference that potentially conflicts with the established call, the calendar event specifying a phone number for the previously scheduled teleconference;

determining whether a phone number of the established call matches the phone number specified by the calendar event representing the previously scheduled teleconference;

if the phone number of the established call matches the phone number specified by the calendar event representing the previously scheduled teleconference, determining that the present call status of the user's telephone does not conflict with the previously scheduled teleconference; and if the phone number of the established call does not match the phone number specified by the calendar event representing the previously scheduled teleconference, determining that the present call status of the user's telephone does conflict with the previously scheduled teleconference; and if the present call status of the user's telephone conflicts with a previously scheduled teleconference, notifying, by the teleconference administration device, prospective participants of the conflict.

2. The method of claim 1 wherein monitoring present call status of a user's telephone further comprises:

storing in a buffer telephone numbers of incoming and outgoing calls of the user's telephone.

3. The method of claim 1 wherein monitoring present call status of a user's telephone further comprises:

determining, upon a predefined time specified in a calendar event representing a previously scheduled teleconference, the present call status of the user's telephone.

4. The method of claim 1 wherein notifying prospective participants of the conflict further comprises:

notifying the prospective participants with predefined message content in accordance with a predefined method of communication, the predefined method of communication and the predefined message content specified in the calendar event representing the previously scheduled teleconference conflicting with the present call status of the user's telephone.

5. The method of claim 4 wherein the predefined method of communication further comprises one of:

delivering, with a telephone call to a prospective participant's telephone number specified for the calendar event of the previously scheduled teleconference conflicting with the present call status of the user's telephone, a pre-recorded audio message that includes the predefined message content;

delivering, to a mobile device of a prospective participant in a previously scheduled teleconference conflicting with the present call status of the user's telephone, a text message using Short Message Service ('SMS') that includes the predefined message content; or sending, to a prospective participant of a previously scheduled teleconference conflicting with the present call status of the user's telephone, an email message that includes the predefined message content.

6. An apparatus for administering participant attendance of teleconferences, the apparatus comprising:

a computer processor, a computer memory operatively coupled to the computer processor, the computer memory having disposed within it computer program instructions executable by the apparatus to:

monitor, by a teleconference administration device comprising one or more modules of automated computing machinery, present call status of a user's telephone, wherein to monitor comprises to detect an establishment of a call;

determine, by the teleconference administration device in dependence upon one or more calendar events representing previously scheduled teleconferences, whether the present call status of the user's telephone conflicts with a previously scheduled teleconference, wherein to determine whether the present call status of the user's telephone conflicts with the previously scheduled teleconference comprises to, identify a calendar event representing the previously scheduled teleconference that potentially conflicts with the established call, the calendar event specifying a phone number for the previously scheduled teleconference;

determine whether a phone number of the established call matches the phone number specified by the calendar event representing the previously scheduled teleconference;

if the phone number of the established call matches the phone number specified by the calendar event representing the previously scheduled teleconference, determine that the present call status of the user's telephone does not conflict with the previously scheduled teleconference; and if the phone number of the established call does not match the phone number specified by the calendar event representing the previously scheduled teleconference, determine that the present call status of the user's telephone does conflict with the previously scheduled teleconference; and if the present call status of the user's telephone conflicts with a previously scheduled teleconference, notify, by the teleconference administration device, prospective participants of the conflict.

7. The apparatus of claim 6 wherein to monitor present call status of a user's telephone further comprises to:
store in a buffer telephone numbers of incoming and outgoing calls of the user's telephone.

8. The apparatus of claim 6 wherein to monitoring present call status of a user's telephone further comprises to:
determine, upon a predefined time specified in a calendar event representing a previously scheduled teleconference, the present call status of the user's telephone.

9. The apparatus of claim 6 wherein to notify prospective participants of the conflict further comprises to:
notify the prospective participants with predefined message content in accordance with a predefined method of communication, the predefined method of communication and the predefined message content specified in the calendar event representing the previously scheduled teleconference conflicting with the present call status of the user's telephone.

10. The apparatus of claim 9 wherein the predefined method of communication further comprises one of:
delivering, with a telephone call to a prospective participant's telephone number specified for the calendar event of the previously scheduled teleconference conflicting with the present call status of the user's telephone, a pre-recorded audio message that includes the predefined message content;
delivering, to a mobile device of a prospective participant in a previously scheduled teleconference conflicting with the present call status of the user's telephone, a text message using Short Message Service ('SMS') that includes the predefined message content; or
sending, to a prospective participant of a previously scheduled teleconference conflicting with the present call status of the user's telephone, an email message that includes the predefined message content.

11. A computer program product for administering participant attendance of teleconferences, the computer program product disposed in a non-transitory tangible computer readable recording medium, the computer program product comprising computer program instructions to:
monitor, by a teleconference administration device comprising one or more modules of automated computing machinery, present call status of a user's telephone, wherein to the computer program instructions to monitor comprises computer program instruction to detect an establishment of a call;
determine, by the teleconference administration device in dependence upon one or more calendar events representing previously scheduled teleconferences, whether the present call status of the user's telephone conflicts with a previously scheduled teleconference, wherein the computer program instructions to determine whether the present call status of the user's telephone conflicts with the previously scheduled teleconference comprises computer program instructions to, identify a calendar event representing the previously scheduled teleconference that potentially conflicts with the established call, the calendar event specifying a phone number for the previously scheduled teleconference;
determine whether a phone number of the established call matches the phone number specified by the calendar event representing the previously scheduled teleconference;
if the phone number of the established call matches the phone number specified by the calendar event representing the previously scheduled teleconference, determine that the present call status of the user's telephone does not conflict with the previously scheduled teleconference; and
if the phone number of the established call does not match the phone number specified by the calendar event representing the previously scheduled teleconference, determine that the present call status of the user's telephone does conflict with the previously scheduled teleconference; and
if the present call status of the user's telephone conflicts with a previously scheduled teleconference, notify, by the teleconference administration device, prospective participants of the conflict.

12. The computer program product of claim 11 wherein the computer program instructions to monitor present call status of a user's telephone further comprises computer program instructions to:
store in a buffer telephone numbers of incoming and outgoing calls of the user's telephone.

13. The computer program product of claim 11 wherein the computer program instructions to monitor present call status of a user's telephone further comprises computer program instructions to:
determine, upon a predefined time specified in a calendar event representing a previously scheduled teleconference, the present call status of the user's telephone.

14. The computer program product of claim 11 wherein the computer program instructions to notify prospective participants of the conflict further comprises computer program instructions to:
notify the prospective participants with predefined message content in accordance with a predefined method of communication, the predefined method of communication and the predefined message content specified in the calendar event representing the previously scheduled teleconference conflicting with the present call status of the user's telephone.

15. The computer program product of claim 14 wherein the predefined method of communication further comprises one of:

delivering, with a telephone call to a prospective participant's telephone number specified for the calendar event of the previously scheduled teleconference conflicting with the present call status of the user's telephone, a pre-recorded audio message that includes the predefined message content;

delivering, to a mobile device of a prospective participant in a previously scheduled teleconference conflicting with the present call status of the user's telephone, a text message using Short Message Service ('SMS') that includes the predefined message content; or sending, to a prospective participant of a previously scheduled teleconference conflicting with the present call status of the user's telephone, an email message that includes the predefined message content.

* * * * *